United States Patent
Bates et al.

(10) Patent No.: US 7,818,374 B2
(45) Date of Patent: Oct. 19, 2010

(54) EFFECTIVE COMMUNICATION IN VIRTUAL WORLDS

(75) Inventors: Cary L. Bates, Rochester, MN (US);
Jason J. Illg, Rochester, MN (US);
Ruthie D. Lyle, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 139 days.

(21) Appl. No.: 12/128,715

(22) Filed: May 29, 2008

(65) Prior Publication Data

US 2009/0300112 A1    Dec. 3, 2009

(51) Int. Cl.
*G06F 15/16* (2006.01)

(52) U.S. Cl. .............. 709/204; 709/206; 709/231; 709/207; 709/219; 715/751; 715/753; 715/758; 715/752; 715/711; 370/389; 370/356; 370/252

(58) Field of Classification Search .......... 709/204, 709/206, 207, 219, 231, 225
See application file for complete search history.

(56) References Cited

U.S. PATENT DOCUMENTS

| | | | |
|---|---|---|---|
| 2005/0249196 A1* | 11/2005 | Ansari et al. | 370/352 |
| 2007/0183440 A1* | 8/2007 | Bennet et al. | 370/419 |
| 2009/0215476 A1* | 8/2009 | Tysowski | 455/466 |

* cited by examiner

*Primary Examiner*—Jude J Jean Gilles
(74) *Attorney, Agent, or Firm*—Rabin & Berdo, PC (57) ABSTRACT

A method, computer program product and computer system for establishing an effective communication between two users in a virtual world, which includes measuring a communication capability for each of the users, and establishing a communication using a default type of communication, if a difference between the communication capabilities of the two users is not above a pre-determined threshold. The method, computer program product and computer system can further establish a communication using an alternate type of communication, if a difference is above the pre-determined threshold.

17 Claims, 5 Drawing Sheets

EFFECTIVE COMMUNICATION IN VIRTUAL WORLDS

BACKGROUND

1. Technical Field

The present invention relates to communications in a virtual world. More specifically, it relates to establishing an effective communication between two users in a virtual world using indicators that measure the communication capability of the users.

2. Background Information

A virtual world is a computer-simulated environment which its users can inhabit and in which they can interact. The simulated environment may appear similar to the real world, or it may depict a fantasy world. A user accesses a virtual world using a computer. The computer-simulated virtual world presents perceptual stimuli to the user, who in turn can manipulate elements of the virtual world, and thus experiences tele-presence to a certain degree.

Most virtual worlds allow for multiple users to participate at once, and these users can interact via avatars in real time. An avatar, which refers to a user's representation of himself or herself in a virtual world, is usually depicted as a textual, two-dimensional graphical, or three-dimensional graphical representation. Other forms, for example auditory and touch sensations, are also possible. Virtual worlds' existence usually continues regardless of whether individual users are logged in, and they simulate rules (e.g. gravity, topography, locomotion, real-time actions, and communication) based on the real world or some hybrid fantasy world. Most Virtual worlds allow users to alter, develop, build, or submit customized content, and encourage the formation of in-world social groups like teams, clubs, cliques, housemates, neighborhoods, etc. As an example, many multiplayer online games create virtual worlds that are similar to the real world, with real world rules, real-time actions, and communication.

Communication between users, or more accurately, communication between the avatars of the users in the virtual world, has ranged from text, graphical icons, visual gesture, sound, and sometimes forms using touch and balance senses. For example, users in many multiplayer online games type textual messages to communicate with each other, and real-time voice communication using VOIP (Voice over Internet Protocol) is used as a supplementary type of communication.

One of the problems in the virtual world is that different users may have different commutation capacities. For example, when instant messaging (IMing) is used as the type of communication, users may type at a different speed. Thus, when a user tries to find another user to instant message with, it is not rare that the other party is not as responsive as expected, or types at a rate that is much different than the user, which makes the instant messaging uncomfortable between both parties. Usually a user who types fast wants to IM with another user who can reply quickly, and a user who types slowly may be overwhelmed by one who types really fast.

A mechanism is needed to identify the communication capabilities of a user (e.g. typing or spelling abilities in instant messaging), so that users of similar communication capacities can engage in more productive dialogues in a virtual world.

SUMMARY

A method, computer program product and computer system for establishing an effective communication between two users in a virtual world, which includes measuring a communication capability for each of the users, and establishing communication using a default type of communication, if a difference between the communication capabilities of the two users is not above a pre-determined threshold. The method, computer program product and computer system can further establish a communication using an alternate type of communication, if a difference is above the pre-determined threshold.

DETAILED DESCRIPTION

The invention will now be described in more detail by way of example with reference to the embodiments shown in the accompanying Figures. It should be kept in mind that the following described embodiments are only presented by way of example and should not be construed as limiting the inventive concept to any particular physical configuration. Further, if used and unless otherwise stated, the terms "upper," "lower," "front," "back," "over," "under," and similar such terms are not to be construed as limiting the invention to a particular orientation. Instead, these terms are used only on a relative basis.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable media may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention enables a mechanism to measure the commutation capability of a user in a virtual world. Users of similar communication capacities can then be identified, and more effective communication can be established between these users in the virtual world.

In this specification, instant messaging is used as the exemplar type of communication in a virtual world, and typing speed and spelling abilities are used as exemplar measures of the communication capability of a user. However, other types of communication can also be applied, which include but are not limited to graphical icons, visual gesture, sound, and forms using touch and balance senses. Similarly, other measures of the communication capability of a user, e.g. language preference, can also be applied. Other types of communication and measures of communication capacities can be contemplated by a person of skill in the art.

In this specification, the present invention is described with reference to a communication established between two users. In other embodiments of the present invention, a communication may be established between two groups of users, or between one user and another group of users. Moreover, the measure of communication capacities can be defined on a single user or on a group of users. For example, a group of users may have the same communication capability that is the average of the communication capacities of the individual users in the group.

In one embodiment of the present invention, as a user types and sends instant messages, the system tracks the speed at which the messages are produced, and monitors the messages for typing errors and spelling mistakes. A measure, which includes the statistics of typing speed, typing errors and spelling mistakes, is associated with each user to describe the communication capability of the user. Since the statistics are more accurate if a user's communication behavior is monitored for a longer period of time, a different measure may be chosen to calculate the communication capability for a new user or a user who does not communicate frequently with other users. For example, a new user may be set to have a high communication capability, so that he/she is encouraged to be talked to, and thus his/her communication capability can be measured more effectively over time.

In another embodiment of the present invention, there are two communication styles, a formal style and an informal style. For different communication styles, typing errors and spelling mistakes are counted differently, thus resulting different communication capabilities for the same user. Typically, more abbreviations, variations of words and tolerance of grammar errors are allowed for the informal style of communications. Additionally, in a formal communication, a user will take more time to ensure his/her grammar and spelling are correct, which will further lower his/her communication capability.

In one embodiment of the present invention, the communication capability can be measured and then showed in the virtual world using a virtual world object, for example, a metal neck ring. If the avatar of a user encounters another avatar in the virtual world who possesses this metal neck ring, the user knows that he can easily communicate with the user of the latter avatar because they both have similar communication capacities, e.g. similar typing speed and spelling skills.

In one embodiment of the present invention, the ability of a user to see the virtual world objects that show the communication capacities of other users can be implemented as an optional feature, which, for example, can only be obtained after a user activates it. In another embodiment of the present invention, the ability of a user to prevent other users from seeing his communication capability (i.e. the virtual world objects) can be implemented as an optional feature, so that the communication between this user and other users will not be affected by this capability.

In an alternate embodiment of the present invention, the communication capability can be implemented as multiple objects in a virtual world, where each object represents a different level of difficulty in communication. For example, neck rings of three different types of medal—gold, silver or bronze—can appear to suggest the relative similarity of the communication capacities of two users, where a gold ring means they can communicate most easily and a bronze ring means a communication difficulty may exist between the two parties. In another alternate embodiment of the present invention, a virtual world object can be implemented where a feature of continuous value is used to indicate how similar the communication capabilities of the two users are. For example, the brightness of the object indicates the similarity (with a non-discrete value) of the communication capabilities between the two parties.

In one embodiment of the present invention, if the ability of a user (user X) to see the communication capacities of others is enabled in a virtual world, every time the avatar of another user, user Y, approaches the avatar of user X, user X can compare their own communication capability to the communication capability of user Y. If their communication capabilities are similar (i.e. within a pre-determined threshold), a metal neck ring appears around the neck of the avatar of user Y, so that user X knows that he can communicate with user Y easily.

A user X communicates with another user Y whom user X encounters in the virtual world. Or more accurately, a user X communicates with a user Y whose avatar the avatar of user X encounters in the virtual world. This communication can be more effectively established if the communication capabilities of user X and user Y are known. If user X and user Y have similar communication capabilities, they can communicate easily using the current type of communication (i.e. instant messaging). However, there are situations when user Y possesses a different communication capability, but user X still needs to communicate with user Y.

In one embodiment of the present invention, an alternate type of communication, for example, a voice communication using VOIP is provided. User X will send an invitation to user Y who has a different communication capability for establishing a communication using VOIP. If user X and user Y are communicating using the current type of communication (i.e. instant messaging), the invitation can be sent over the communication. If communication has not been established, the alternate type of communication (i.e. VOIP) will be specified as the preferred type of communication.

In an alternate embodiment of the present invention, if user X wants to communicate with user Y who possesses a different communication capability, both users are prompted to use a standardized shorthand mechanism to allow for faster text input. For example, both users can switch to use a predictive text technology, e.g. T9 predictive text input method, or Eatoni Wordwise. In other embodiments of the present invention, other approaches can be implemented to help user X and user Y to communicate effectively. For example, both users can be prompted to use a speech recognition technology, so that their communication is not limited by the typing speed or typing errors. Alternatively, common words or sentences, e.g. "I will be right back", can be implemented as buttons, shortcuts or other types of easy inserting, so that the typing speed of the slower user can be improved. Moreover, the computer system through which a user accesses the virtual world can have learning capabilities (e.g. by using some machine learning technologies) to automatically interpret the communication behavior of the user. For example, frequently misspelled words or certain user abbreviations can be replaced automatically. The replacement can be done before the communication capability of a user is calculated.

In an alternate embodiment of the present invention, the system can even match users with similar communication capabilities, so that avatars of similar communication capabilities are more likely to meet each other in the virtual world.

A preferred embodiment of the present invention is described with reference to FIG. 1-FIG. 4.

Figure 1:
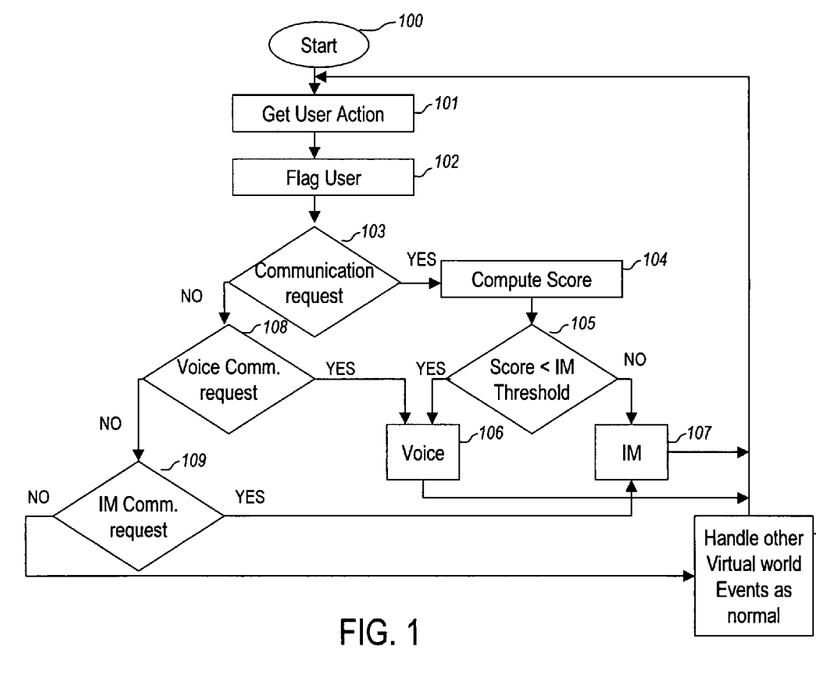
FIG. 1 is a flowchart illustrating how two users establish a communication in a virtual world.

FIG. 1 is a flowchart illustrating how two users establish the communication in the virtual world in one embodiment of the present invention. In this embodiment, instant messaging is the primary type of communication and voice communication is an alternative. The process starts at state 100. The avatar of a user, user X, meets the avatar of another user, user Y, in the virtual world, which triggers a user action in state 101. The communication capability of user Y is calculated and compared to the communication capability of user X in state 102. A flag is set in state 102 to indicate how similar their communication capacities are, and a "gold", "silver" or "bronze" neck ring may be displayed appropriately for user Y in the virtual world. In state 103, a communication request is checked, and if such a request exists, a score will be calculated in state 104 to measure how likely an effectively IM communication can be established between user X and user Y. If the score is below a pre-determined IM threshold (state 105), IM will be used as the type for the communication between user X and user Y (state 107). Otherwise, a voice communication will be established between user X and user Y (state 106). In case that there is no generic communication request, the system will continue to check if there is a specific voice communication request (state 108). If there is a voice communication request, a voice communication will be established between user X and user Y (state 106). Otherwise, the system will continue to check if there is a specific IM communication request (state 109). If there is an IM communication request, an IM communication will be established between user X and user Y (state 107). Otherwise, the system will continue to handle other virtual world events as normal in state 110, and continue the process from state 101.

Figure 2:
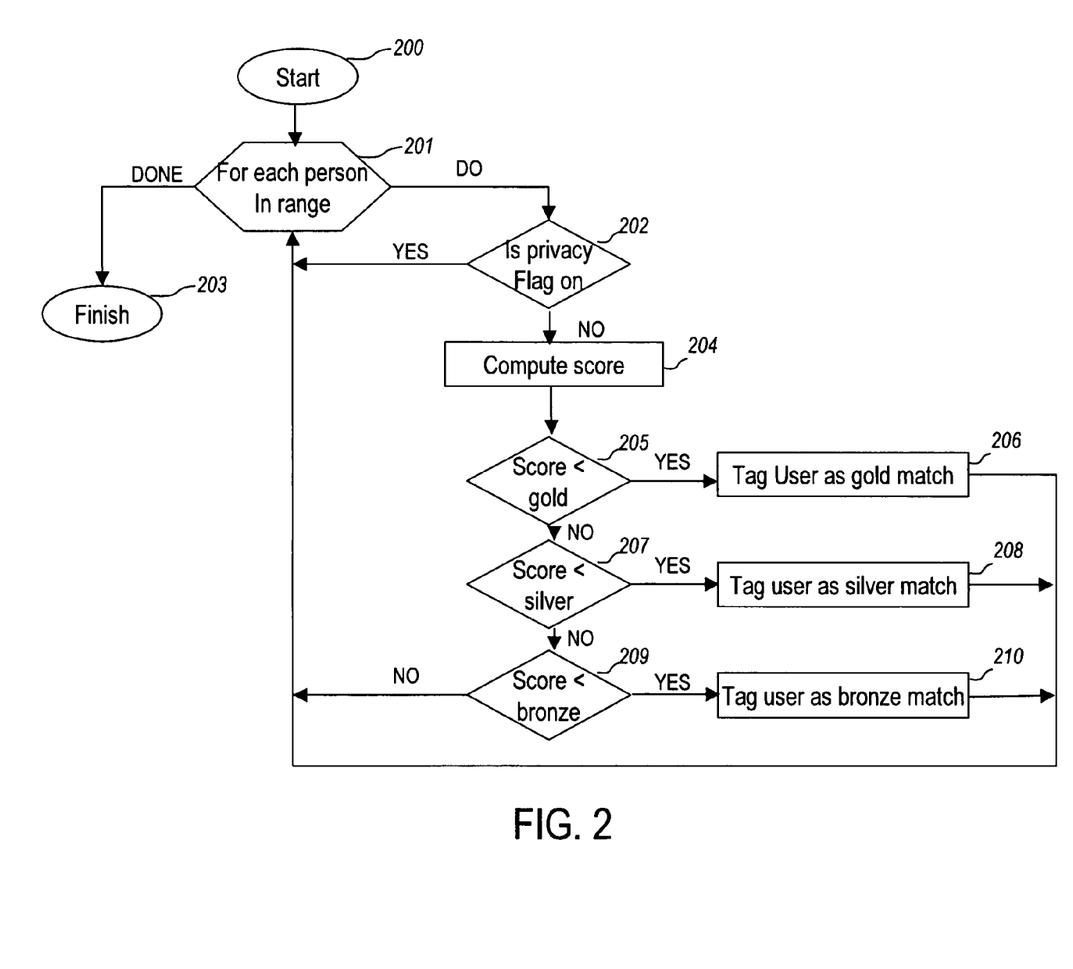
FIG. 2 is a flowchart that illustrates how to display the similarity of the communication capabilities between users.

FIG. 2 is a flowchart that illustrates how to display the similarity of the communication capabilities between users (i.e. state 102 in FIG. 1). The process states at state 200. For a user X, each user, user Y, in the range that he/she can communicate with is first identified (state 201). If the privacy flag of user Y is on (state 202), no similarity of the communication capabilities will be calculated, because user Y prefers not to use this feature. Otherwise, a score will be calculated for user Y in state 204 to indicate the similarity between the communication capabilities of user X and user Y. This score will first be compared to a gold threshold in state 205. If the score is below the gold threshold, in state 206 user X and user Y will be labeled as a gold match user pair, and a gold neck ring will appear on the avatar of user Y in the virtual world. Similar test for the silver or bronze match will be completed in state 207 and 209 respectively, and appropriate actions to label the match will be completed in states 208 or 210 accordingly. The whole process will repeat, and stop at state 203 when all avatars in the range that the avatar of user X can communicate with are labeled.

Figure 3:
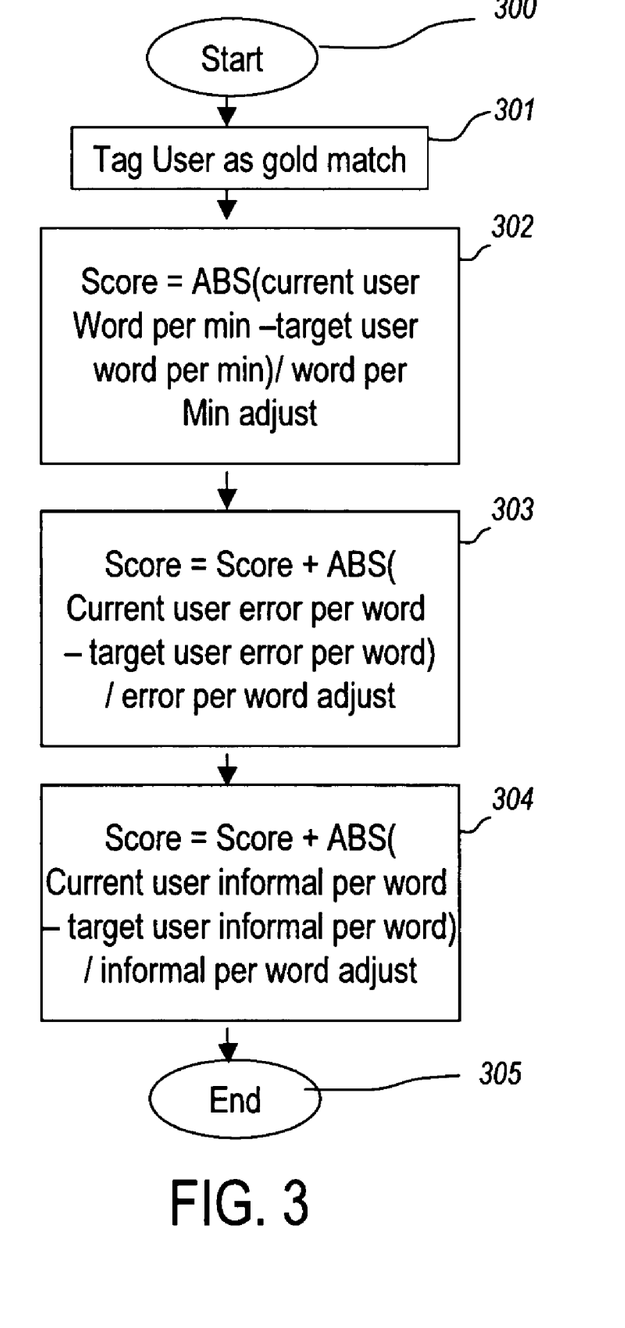
FIG. 3 is a flowchart illustrating how to compute a score to indicate the similarity of the communication capabilities between users.

FIG. 3 is a flowchart illustrating how to compute the score to indicate the similarity of communication capabilities between the users (i.e. state 104 in FIG. 1 and state 204 in FIG. 2). The process starts at state 300. If a user X meets a user Y in the virtual world, users X and Y will be labeled as a gold match user pair in state 301 by default. Then, a difference between the typing speeds (i.e words/min) of user X and user Y is calculated in state 302, a difference between the typing errors (i.e. errors/word) of user X and user Y is calculated in state 303, and a difference between the spelling mistakes (i.e. informal words/word) of user X and user Y is calculated in state 304. The three differences (in absolute value) are divided by three adjusting values to normalize them in states 302, 303 and 304, respectively, and are added together. The sum is the computed score that indicates the similarity of the communication capabilities between user X and user Y.

Figure 4:
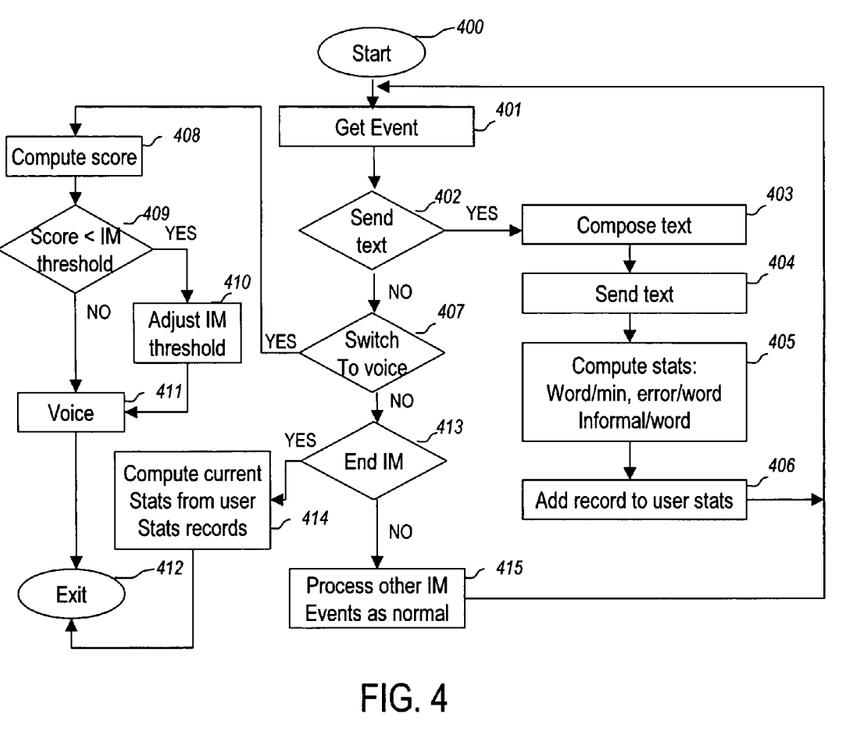
FIG. 4 illustrates a communication process between users, where the IM is the primary type of communication and the voice communication is an alternative.

FIG. 4 illustrates the communication process between users, where the IM is the primary type for communication and the voice communication is an alternative. The process starts in state 400. An IM event is obtained in state 401. If this event requires a text message to be sent (state 402), a text message will be composed (state 403) and sent (state 404). Communication capability of both users will then be updated to include new statistic information (state 405 and state 406). If no text message needs to be sent for the IM event, the process will continue to state 407 to decide whether a voice communication needs to be established. If the communication needs to be switched to voice for some reason (e.g. the IM communication is too slow), the process will continue on to adjust appropriate thresholds for IM, so that in the future voice can be the default mode of communication for users in similar situations. If a voice communication needs to be established, the score indicating the similarity of the communication capabilities of users will be calculated in state 408. If this score is below the pre-determined IM score (state 409), the IM threshold will be adjusted automatically in state 410. A voice communication will be established in state 411, and then the process exits in state 412. If there is no need to switch to voice, a test will be performed to check whether the IM will be ended (state 413). If so, before the process exits in state 412, statistics for users that describe their communication capabilities will be updated in state 414. If the IM will not be ended, other IM events will be processed as normal in state 415, and then the whole process continues at state 401.

Figure 5:
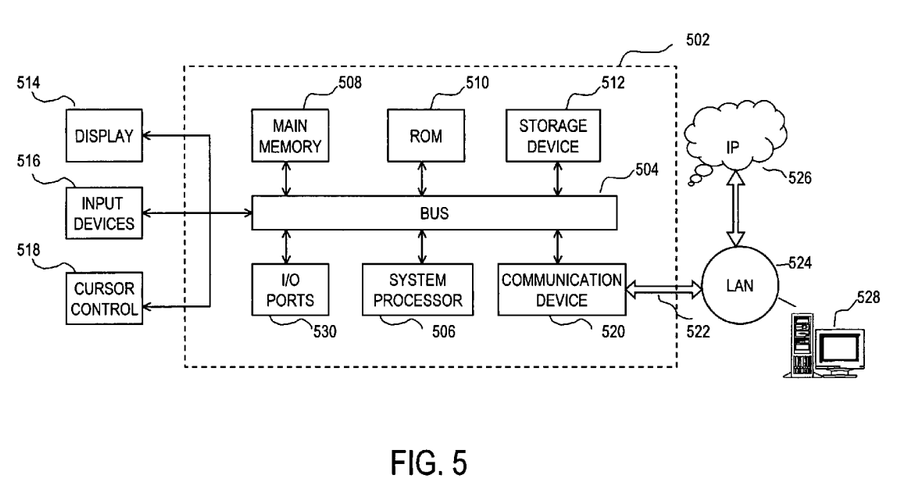
FIG. 5 is a conceptual diagram of a computer system in which the present invention can be implemented.

FIG. 5 illustrates a computer system (502) upon which the present invention may be implemented. The computer system may be any one of a personal computer system, a work station computer system, a lap top computer system, an embedded controller system, a microprocessor-based system, a digital signal processor-based system, a hand held device system, a personal digital assistant (PDA) system, a wireless system, a wireless networking system, etc. The computer system includes a bus (504) or other communication mechanism for communicating information and a processor (506) coupled with bus (504) for processing the information. The computer system also includes a main memory, such as a random access memory (RAM) or other dynamic storage device (e.g., dynamic RAM (DRAM), static RAM (SRAM), synchronous DRAM (SDRAM), flash RAM), coupled to bus for storing information and instructions to be executed by processor (506). In addition, main memory (508) may be used for storing temporary variables or other intermediate information during execution of instructions to be executed by processor. The computer system further includes a read only memory (ROM) 510 or other static storage device (e.g., programmable ROM (PROM), erasable PROM (EPROM), and electrically erasable PROM (EEPROM)) coupled to bus 504 for storing static information and instructions for processor. A storage device (512), such as a magnetic disk or optical disk, is provided and coupled to bus for storing information and instructions. This storage device is an example of a computer readable medium.

The computer system also includes input/output ports (530) to input signals to couple the computer system. Such coupling may include direct electrical connections, wireless connections, networked connections, etc., for implementing automatic control functions, remote control functions, etc. Suitable interface cards may be installed to provide the necessary functions and signal levels.

The computer system may also include special purpose logic devices (e.g., application specific integrated circuits (ASICs)) or configurable logic devices (e.g., generic array of logic (GAL) or re-programmable field programmable gate arrays (FPGAs)), which may be employed to replace the functions of any part or all of the method as described with reference to FIG. 1-FIG. 4. Other removable media devices (e.g., a compact disc, a tape, and a removable magneto-optical media) or fixed, high-density media drives, may be added to the computer system using an appropriate device bus (e.g., a small computer system interface (SCSI) bus, an enhanced integrated device electronics (IDE) bus, or an ultra-direct 15 memory access (DMA) bus). The computer system may additionally include a compact disc reader, a compact disc reader-writer unit, or a compact disc jukebox, each of which may be connected to the same device bus or another device bus.

The computer system may be coupled via bus to a display (514), such as a cathode ray tube (CRT), liquid crystal display (LCD), voice synthesis hardware and/or software, etc., for displaying and/or providing information to a computer user. The display may be controlled by a display or graphics card. The computer system includes input devices, such as a keyboard (516) and a cursor control (518), for communicating information and command selections to processor (506). Such command selections can be implemented via voice recognition hardware and/or software functioning as the input devices (516). The cursor control (518), for example, is a mouse, a trackball, cursor direction keys, touch screen display, optical character recognition hardware and/or software, etc., for communicating direction information and command selections to processor (506) and for controlling cursor movement on the display (514). In addition, a printer (not shown) may provide printed listings of the data structures, information, etc., or any other data stored and/or generated by the computer system.

The computer system performs a portion or all of the processing steps of the invention in response to processor executing one or more sequences of one or more instructions contained in a memory, such as the main memory. Such instructions may be read into the main memory from another computer readable medium, such as storage device. One or more processors in a multi-processing arrangement may also be employed to execute the sequences of instructions contained in main memory. In alternative embodiments, hard-wired circuitry may be used in place of or in combination with software instructions. Thus, embodiments are not limited to any specific combination of hardware circuitry and software.

The computer code devices of the present invention may be any interpreted or executable code mechanism, including but not limited to scripts, interpreters, dynamic link libraries, Java classes, and complete executable programs. Moreover, parts of the processing of the present invention may be distributed for better performance, reliability, and/or cost.

The computer system also includes a communication interface coupled to bus. The communication interface (520) provides a two-way data communication coupling to a network link (522) that may be connected to, for example, a local network (524). For example, the communication interface (520) may be a network interface card to attach to any packet switched local area network (LAN). As another example, the communication interface (520) may be an asymmetrical digital subscriber line (ADSL) card, an integrated services digital network (ISDN) card or a modem to provide a data communication connection to a corresponding type of telephone line. Wireless links may also be implemented via the communication interface (520). In any such implementation, the communication interface (520) sends and receives electrical, electromagnetic or optical signals that carry digital data streams representing various types of information.

Network link (522) typically provides data communication through one or more networks to other data devices. For example, the network link may provide a connection to a computer (526) through local network (524) (e.g., a LAN) or through equipment operated by a service provider, which provides communication services through a communications network (528). In preferred embodiments, the local network and the communications network preferably use electrical, electromagnetic, or optical signals that carry digital data streams. The signals through the various networks and the signals on the network link and through the communication interface, which carry the digital data to and from the computer system, are exemplary forms of carrier waves transporting the information. The computer system can transmit notifications and receive data, including program code, through the network(s), the network link and the communication interface.

It should be understood, that the invention is not necessarily limited to the specific process, arrangement, materials and components shown and described above, but may be susceptible to numerous variations within the scope of the invention.

What is claimed is:

1. A method for establishing effective communication between at least two users in a virtual world, comprising:
   ascertaining a communication capability of each of the users;
   determining a difference between the communication capabilities of the users; and
   establishing communication using a default type of communication, if the difference is not above a pre-determined threshold, wherein
      the default type of communication is instant messaging, and
      the communication capability comprises statistics of a typing speed, typing errors and spelling mistakes of the user.

2. The method of claim 1, further comprising establishing the communication using an alternate type of communication, if the difference is above the pre-determined threshold.

3. The method of claim 2, wherein the alternate type of communication is a voice communication using Voice over Internet Protocol (VOIP).

4. The method of claim 1, wherein the communication capability of the user can appear in the virtual world as one of a single object, multiple objects each showing a discrete level of difficulty in communication, and an object with a continuous feature showing the difficulty in communication.

5. The method of claim 1, wherein the ascertaining comprises measuring the communication capability in real time.

6. A computer program product for establishing effective communication between at least two users in a virtual world, the computer program product comprising:
   a computer usable medium having computer usable program code embodied therewith, the computer usable program code comprising:
      instructions to ascertain a communication capability of each of the users;
      instructions to determine a difference between the communication capabilities of the users; and
      instructions to establish communication using a default type of communication, if the difference is not above a pre-determined threshold, wherein
         the default type of communication is instant messaging, and
         the communication capability comprises statistics of a typing speed, typing errors and spelling mistakes of the user.

7. The computer program product of claim 6, further comprising instructions to establish the communication using an alternate type of communication, if the difference is above the pre-determined threshold.

8. The computer program product of claim 7, wherein the alternate type of communication is a voice communication using Voice over Internet Protocol (VOIP).

9. The computer program product of claim 6, wherein the communication capability of the user can appear in the virtual world as one of a single object, multiple objects each showing a discrete level of difficulty in communication, and an object with a continuous feature showing the difficulty in communication.

10. The computer program product of claim 6, wherein the instructions to ascertain comprises instructions to measure the communication capability in real time.

11. A computer system comprising:
    a processor;
    a memory operatively coupled with the processor;
    a storage device operatively coupled with the processor and the memory; and
    a computer program product for establishing effective communication between at least two users in a virtual world, the computer program product comprising:
       a computer usable medium having computer usable program code embodied therewith, the computer usable program code comprising:
          instructions to ascertain a communication capability of each of the users;
          instructions to determine a difference between the communication capabilities of the users; and
          instructions to establish communication using a default type of communication, if the difference is not above a pre-determined threshold, wherein
             the default type of communication is instant messaging, and
             the communication capability comprises statistics of a typing speed, typing errors and spelling mistakes of the user.

12. The computer system of claim 11, further comprising instructions to establish the communication using an alternate type of communication, if the difference is above the pre-determined threshold, and wherein the instructions to ascertain comprises instructions to measure the communication capability in real time.

13. The computer system of claim 12, wherein the alternate type of communication is a voice communication using Voice over Internet Protocol (VOIP).

14. The computer system of claim 11, wherein the communication capability of the user can appear in the virtual world as one of a single object, multiple objects each showing a discrete level of difficulty in communication, and an object with a continuous feature showing the difficulty in communication.

15. The method of claim 1, wherein
the ascertaining a communication capability further includes ascertaining a communication capability of a group of the users; and
the determining a difference further includes determining the difference of communication capabilities between two individual users, between one individual user and a group of users, or between two groups of users.

16. The computer program product of claim 6, wherein
the instructions to ascertain a communication capability further includes instructions to ascertain a communication capability of a group of the users; and
the instructions to determine a difference further includes instructions to determine the difference of communication capabilities between two individual users, between one individual user and a group of users, or between two groups of users.

17. The computer system of claim 11, wherein
the instructions to ascertain a communication capability further includes instructions to ascertain a communication capability of a group of the users; and
the instructions to determine a difference further includes instructions to determine the difference of communication capabilities between two individual users, between one individual user and a group of users, or between two groups of users.

* * * * *